C. H. WILLIAMS.
SAFETY GUARD FOR BRAKE BEAMS.
APPLICATION FILED SEPT. 3, 1918.

1,334,124.

Patented Mar. 16, 1920.

Inventor
Charles Haines Williams

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY-GUARD FOR BRAKE-BEAMS.

1,334,124.

Specification of Letters Patent.  Patented Mar. 16, 1920.

Application filed September 3, 1918.  Serial No. 252,375.

*To all whom it may concern:*

Be it known that I, CHARLES HAINES WILLIAMS, a citizen of the United States, residing at the city of Chicago, county of Cook, State of Illinois, have invented a certain new and useful Improvement in Safety-Guards for Brake-Beams, of which the following is a full, clear, and exact description, such as will enable others skilled in the art to which it appertains to make and use the same, reference being had to the accompanying drawings, forming part of this specification, in which—

This invention relates to a new and useful improvement in safety guards for brake beams of the type illustrated in an application filed by me July 3, 1917, serially numbered 178,457.

The object of my present invention is to combine three differently functioning elements in a concrete structure, *i. e.*, a safety bar for catching and supporting the beam in the event that the brake hangers or beam supporting devices are broken or lost, thereby preventing the beam from dropping onto the rails, and possibly derailing the car; a yielding support for guiding the beam in its movement toward the wheels whereby the brake shoes are subject to even wear from brake power applied to the brakes; and a guard member for preventing excess upward and retrieving movement of the beam.

Figure 1:
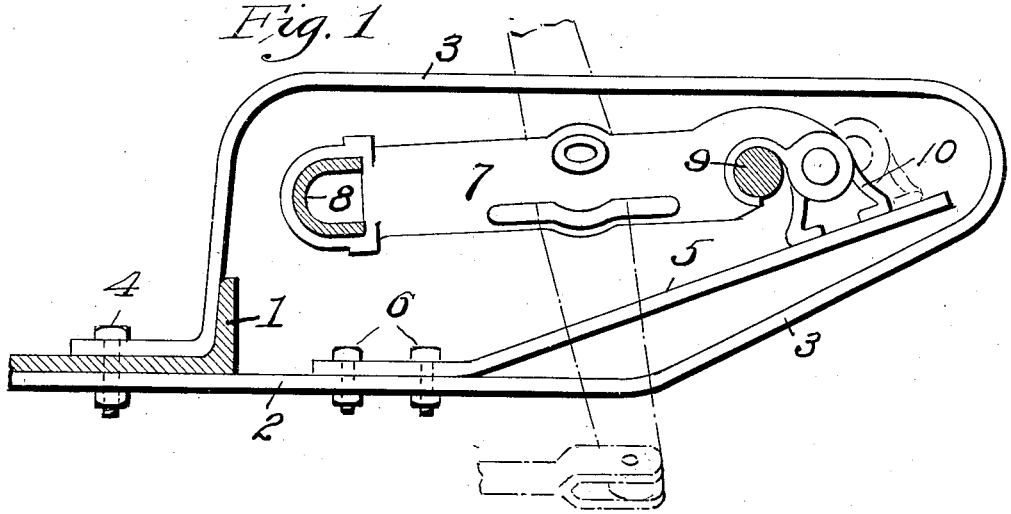
Figure 1 is a side elevational view of my improved safety guard for brake beams.
Figure 2:
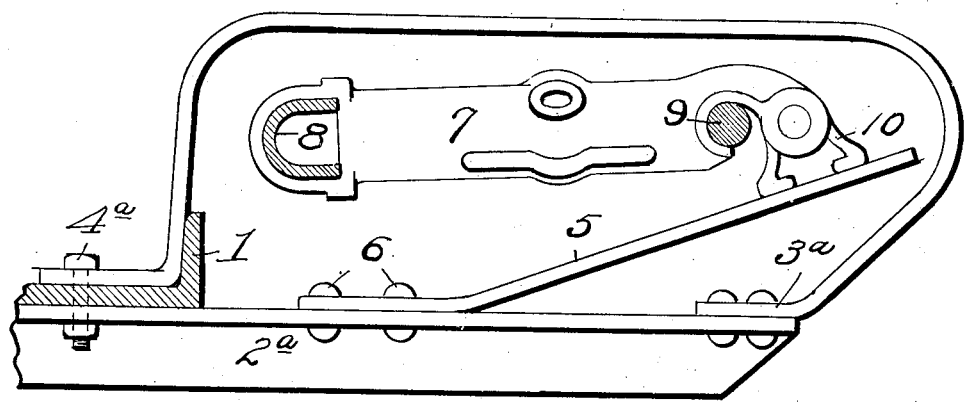
Fig. 2 is a similar view of a modified form.

In the drawings, 1 indicates a spring plank of a car truck to which my improved guard and supporting members may be attached. 2 is a brake beam safety bar, shown in Fig. 1 as a flat bar, and in Fig. 2 as an angle, channel or other flanged member 2ª. This safety bar element is preferably rigidly secured to a part of the car truck, such as the spring plank, and is possessed of sufficient strength and rigidity to support the beam in the event that the hangers or other supporting devices thereof are broken or lost in service, thereby preventing the beam from falling onto the rails and possibly derailing the car. 3 is a guard member or element which may be integral with the safety bar member 2, as shown in Fig. 1, or which may be attached to the outer end thereof, as shown at 3ª in Fig. 2. This guard member is looped over and around the brake beam and has its inner end secured to a part of the truck.

As shown in Fig. 1, a single bolt 4 is employed to secure the safety bar and the inner end of the guard member to the spring plank, and in Fig. 2, a single bolt 4ª secures the inner end of the guard member and the safety bar member to the spring plank.

The numeral 5 indicates a yielding support secured to the safety bar member by means of securing devices 6, said yielding support extending upwardly at an angle with its free end slightly above the loop forming the safety guard. By this construction, the safety guard member constitutes a stop for limiting the downward yielding movement of the inclined support, and in the event that the same is bent downwardly so that it takes a permanent set, it will still be serviceable in that it is supported by the looped safety guard.

The numeral 7 indicates the strut member of a trussed brake beam, 8 the compression member thereof, and 9 the tension member. 10 is the third or fourth point support in the form of a wear shoe pivotally mounted upon the nose of the strut, and which wear shoe coöperates with and rides upon the yielding support 5.

It will be readily understood that minor changes in the size, form and construction of the various parts of my improved safety guard for brake beams may be made and substituted for those herein shown and described, without departing from the spirit of my invention, the scope of which is set forth in the appended claim.

What I claim is:

The combination of a safety bar member, a looped safety guard member arranged thereabove forming a space within which the brake beam may operate, and a yielding supporting member arranged within said space and whose free end is limited in movement in one direction by said looped safety guard member.

In testimony whereof I hereunto affix my signature this 20th day of August, 1918.

CHARLES HAINES WILLIAMS.

Witnesses:
E. T. WALKER,
M. F. HUNTOON.